Figure 1:
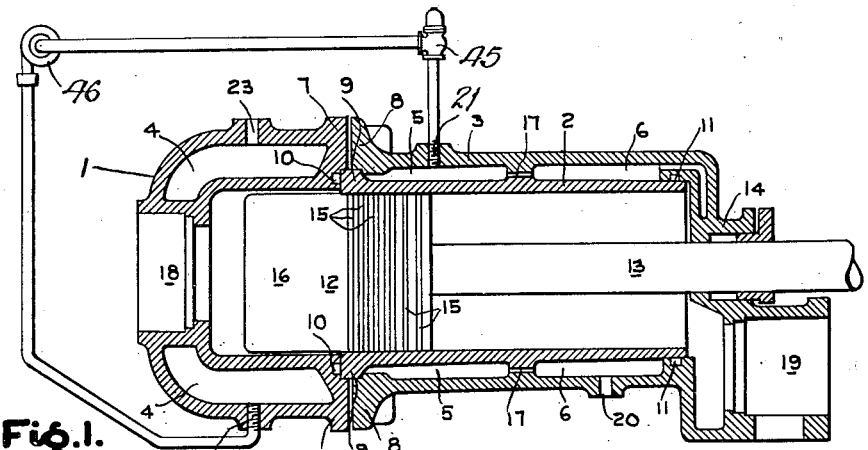

Sept. 22, 1931.  R. W. BAILEY  1,824,528
INTERNAL COMBUSTION ENGINE
Filed Oct. 25, 1927

WITNESS
E. Lutz.

INVENTOR
R.W.Bailey
BY
A. B. Reavis
ATTORNEY

Patented Sept. 22, 1931

1,824,528

UNITED STATES PATENT OFFICE

RICHARD WILLIAM BAILEY, OF ALTRINCHAM, ENGLAND, ASSIGNOR, BY MESNE ASSIGNMENTS, TO ASSOCIATED ELECTRICAL INDUSTRIES, LTD., OF ENGLAND

INTERNAL COMBUSTION ENGINE

Application filed October 25, 1927, Serial No. 228,576, and in Great Britain October 25, 1926.

The invention relates to gas and oil power plants, its main object being to obtain high thermal efficiency in such plant and despite the very high temperatures involved, to maintain satisfactory working of the mechanical parts.

In power plants where gas or oil is burnt in combustion cylinders, it is usual in order to work with initial temperatures as high as possible consistent with satisfactory operation of the mechanical parts, such as valves, pistons and so forth, to employ cooling jackets around these parts and the combustion cylinders, through which jackets flows a suitable cooling medium, usually water. The heat taken up by the cooling medium, hereinafter referred to as "jacket heat" is sometimes utilized for the purpose of raising steam, and the gain in thermal efficiency of the plant as a whole effected by this utilization of the jacket heat increases with the pressure of the steam generated, but as the temperature of saturation increases with the pressure, the temperature of the cylinder walls will correspondingly increase until lubrication difficulties are set up, so that a limit is reached at the barrel above which it is undesirable to increase the steam pressure.

The present invention enables an increased gain of thermal efficiency to be effected in this connection by permitting the above mentioned limit of pressure to be maintained in the barrel jacket, while permitting higher pressures to be employed at other parts of the jackets, and according to one feature of the invention a plurality of jacket sections are provided around the walls of the cylinder, the cooling water or steam flowing in a jacket section adjacent the portion of the cylinder wall where rubbing contact with the piston or other moving part occurs, being at a lower temperature and pressure than that in a section adjacent another portion of the cylinder wall where no rubbing occurs. Preferably heat insulating means is interposed between the portions of the cylinder at which rubbing contact takes place and the adjoining portions so that considerable difference of temperature may exist for example, between the circumferential and end walls of the cylinder, while at the same time such insulating medium may constitute a resilient packing between the parts of the cylinder. Said insulation may be arranged to oppose the flow of heat in a direction radially or axially of the cylinder. The jacket sections are preferably arranged to communicate one with the other so that the cooling water or steam in flowing through the consecutive sections, takes up heat from parts of the plant at which heat is available at successively higher temperatures, so that the fullest advantage is taken of the available heat.

Figure 2:
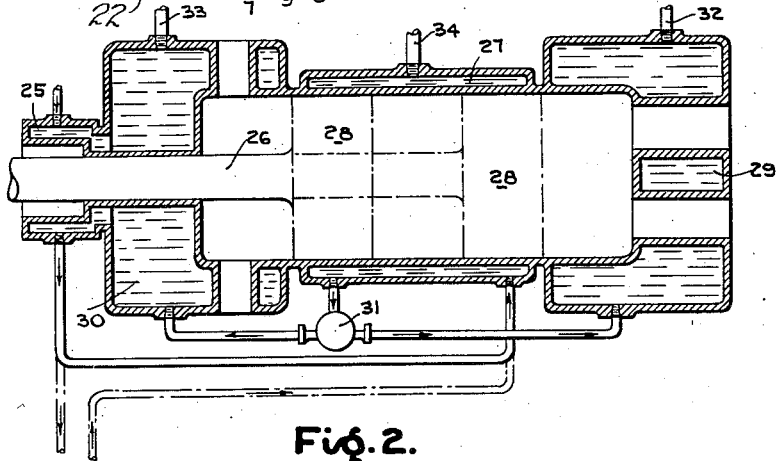
Figure 3:
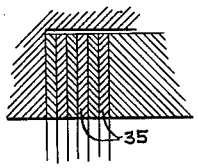
Figure 4:
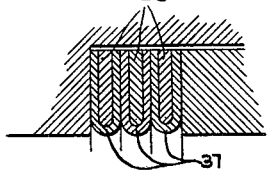
Figure 5:
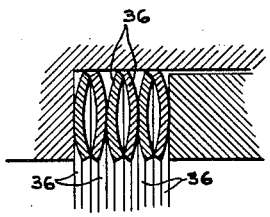
Figure 6:
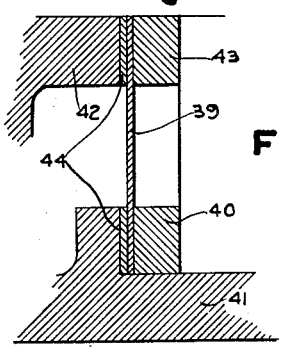

The cooling fluid may also be utilized externally of the cylinder jackets to take up heat derived from the combustion cylinder either directly or through the medium of steam generated by such heat, which is particularly advantageous in plants wherein the whole of the motive fluid for driving the prime movers is produced by a gas or oil combustion component. These and other features of the invention will be more readily understood from the following description with reference to the accompanying drawings, wherein:

Fig. 1 is a sectional view of a cylinder jacketed in accordance with the invention and in which combustion takes place on one side of the piston and air compression on the other side; Fig. 2 illustrates diagrammatically an arrangement of jackets according to the invention applied to a double-acting combustion cylinder, Figs. 3, 4 and 5 show different forms of insulating packing suitable for use in carrying out the invention, and Fig. 6 shows a further detail.

In the construction shown in Fig. 1 the cylinder comprises a cylinder head member 1, an inner barrel or sleeve member 2 and an outer barrel member 3. The head 1 is formed with a water or steam jacket space 4 and further water or steam spaces 5, 6 are provided between the sleeve 2 and the outer barrel 3. The parts are secured together by bolts or the like (not shown) passing through the flanges 7, 8 of members 1 and 3 respectively, the flange 9 of the inner sleeve 2 being clamped between the flanges 7, 8 as shown.

Heat insulating packing 10 of annular form is interposed between the contiguous surfaces of members 1 and 2, heat exchange by conduction between said members being thereby greatly impeded. Further packing rings 11 are provided at the other end of the sleeve 2 between the latter and the outer barrel member 3 so as to afford a water or steam tight joint between these parts which will permit of relative sliding movement in the longitudinal direction. By this arrangement the cylinder members are enabled to expand or contract more or less freely in accordance with temperature variations.

The piston 12 is mounted on the rod 13 slidable in a stuffing box 14 formed integral with the barrel member 3 and is shaped and arranged so that rubbing contact between the piston rings 15 and the cylinder walls occurs only over the surface of the sleeve member 2. The desired clearance volume on the side of the piston where combustion occurs is obtained by extending the top portion 16 of the piston beyond the piston rings towards the cylinder head, the diameter of such extended portion being preferably dimensioned or the bore of the cylinder head member 1 increased so that the piston is out of contact with the cylinder walls adjacent the jacket space 4.

The water or steam spaces 4, 5, 6 constituting the jacket sections are of more or less annular form, the spaces 5, 6 being connected by a narrow passage 17 existing between the members 2, 3 and chambers 18, 19 are provided at the top and bottom ends of the cylinder for the reception of the necessary valves (not shown).

An inlet 20 for the cooling fluid is provided communicating with the jacket space 6 and an outlet 21 communicating with the jacket space 5 of the barrel portion of the cylinder. An inlet 22 and an outlet 23 are also provided communicating with the jacket space 4 of the cylinder head member 1. It will be appreciated that said inlets and outlets are represented more or less diagrammatically in Fig. 1 and may take other forms in practice.

In arranging the operation of the cooling system with the construction above described, it is advantageous first to determine the highest safe limits of temperature which may be permitted at the inner walls of the cylinder head 1 and the barrel 2, 3 respectively. The former will be limited mainly by the strength of the material employed under conditions of high temperature and pressure and the latter by the temperature at which lubrication difficulties arise. The highest permissible temperature of the cooling fluid in the jacket space 4 of the head 1 and the jacket spaces 5, 6 of the barrel 2, 3 may thus be determined and the pressures to be maintained within the spaces will preferably be in the region of the saturation pressure of steam at such temperatures.

Water is supplied to the inlet 20 at any convenient temperature, having preferably received a preliminary heating in some other portion of the plant, and takes up sensible heat while flowing through the jackets 6, 5 to the outlet 21. Even if the water is allowed to boil in these jacket sections the temperature will not exceed the predetermined value, the pressure being maintained substantially constant, for example, by means of a loaded valve 45 controlling the flow through the outlet pipe. Moreover by virtue of the restricted passages 17 a positive flow of cooling fluid from the inlet 20 near one end of the barrel portion to the outlet 21 near the other end thereof is secured, thereby assuring a temperature gradient which rises towards the combustion end of the cylinder.

Some or all of the fluid passing out of the barrel jacket outlet 21 or heated fluid from some other source may be forced by a pump 46 through inlet 22 into the cylinder head jacket 4 at a substantially higher pressure and in this jacket takes up further sensible and/or latent heat before leaving by the outlet 23, preferably in the form of saturated steam at high pressure. If desired fins or ribs may be provided upon the cylinder walls inside the jackets to facilitate the transfer of heat to the cooling fluid.

By the arrangement above described the walls of the barrel portion 2 and the head portion 1 are each maintained at substantially constant temperatures, the temperature adjacent the jacket space 6 at which the cooling fluid enters being slightly lower than that adjacent the space 5, and both of said temperatures being considerably below that obtaining in the space 4 of the cylinder head. The highest temperatures which are convenient or practical may thus be maintained at the different parts of the cylinder and the maximum advantage taken of the availability of heat thereat, such heat being conserved by the hot water or steam leaving the cooling system and subsequently utilized to perform work in a prime mover. At the same time the temperatures in the various jacket sections are limited so that they cannot rise above the desired maximum provided that the water supply to the sections is maintained.

A further example of the invention is illustrated diagrammatically by Fig. 2. in which a double-acting combustion cylinder is provided with a jacket 25 around the gland through which the piston rod 26 slides, a barrel jacket 27 around the portion of the cylinder where rubbing contact with the piston 28 occurs (the limits of the piston stroke being indicated by full and broken lines respectively), and end jackets 29, 30 around the top and bottom of the cylinder where the highest temperatures are permissable. Suitable chambers for the inlet and outlet valves, ignition devices or the like, are provided in the jackets 29, 30 as will be evident. Connections are made between the jackets, so that cooling water flows first through the gland jacket 25 and then to the barrel jacket 27, both of these jackets being at substantially the same pressure, for example atmospheric pressure. A pump 31 draws water from the intermediate jacket 27 and delivers it at a higher pressure to the end jackets 29, 30. The steam generated in said end jackets passes away through outlets 32, 33 for use in a prime mover, while steam generated in the intermediate jacket 27 may be removed through an outlet 34.

The insulation employed between the various portions of the cylinder, the insulation 10 (Fig. 1) for example, between the cover jacket and the barrel, may be of various forms. In one construction, illustrated by Fig. 3, the heat insulation takes the form of packing consisting of thin metal plates 35, for example, nickel, the surfaces of the plates being oxidized or coated to afford resistance to the flow of heat. Several such plates together providing a flexible joint which will take up in some degree expansion due to the changes of temperature of the parts and will permit unequal expansion of the cylinder walls in the radial direction. The plates may be in the form of complete rings to be interposed between the ends of the barrel and head jacket members or may be otherwise formed to suit the parts to which they are adapted. The plates may be cambered in cross section as shown in Fig. 5, and disposed so that consecutive plates 36 are arranged with their camber opposed whereby the flexibility of the packing is improved.

In another form, illustrated in Fig. 4, the packing consists of metal rings 37 or the like, of U-shaped cross section packed with asbestos 38 or some other material of low conductivity, the closed side of the packing rings or the like being preferably faced towards the interior of the cylinder.

The portions of the cylinders and the jackets with the packing pieces therebetween may be held together in any suitable manner, for example, by means of bolts extending from end to end of the cylinders. A convenient construction whereby the cylinder members are prevented from moving out of axial alignment while permitting a limited amount of flexibility between the parts is illustrated in Fig. 6. In this construction an annular diaphragm 39 is secured at its inner circumference by a clamping ring 40 to the inner barrel or sleeve 41 of the cylinder and at its outer circumference to a member, for example, a portion of the cylinder head jacket 42 by a clamping ring 43. A number of segments of thin plates may be employed instead of the diaphragm and the clamping rings may similarly comprise segmental members. Heat insulation 44 is preferably interposed between the diaphragm and the cylinder members connected thereby so that there is no direct contact between the metal cylinder parts.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In an engine, the combination of a cylinder embodying a barrel porton and a head portion, a piston disposed within the cylinder and movable in the barrel portion thereof, separate cooling jackets associated with the barrel portion and the head portion, and means for admitting cooling media of relatively low temperature to the jacket associated with the barrel portion and admitting cooling media of relatively high temperature to the jacket associated with the head portion.

2. In an engine, the combination of a cylinder having a head portion, a piston movable in the cylinder and contacting with the walls thereof, a cooling jacket associated with the portion of the cylinder making contact with the piston, another cooling jacket associated with the head portion of the cylinder, means for admitting cooling fluid at a relatively low pressure to the first cooling jacket, and means for admitting cooling fluid at a relatively higher pressure to the second cooling jacket.

3. In an engine, the combination of a cylinder having relatively low and relatively high temperature portions, a piston movable in the cylinder, a plurality of jacket spaces associated, respectively, with the temperature positions of the cylinder, and means for admitting cooling media at relatively low and high pressures to the low and high temperature jacket spaces, respectively.

4. In an engine, the combination of a cylinder having relatively low and relatively high temperature portions, a piston movable in the cylinder, separate cooling jackets associated with the respective temperature portions of the cylinder, and means for admitting cooling fluids to the respective jackets, the cooling fluid in one of the jackets comprising a gaseous medium having a pressure approximately equal to the saturation pressure corresponding to the temperature of its associated region cylinder portions.

5. In an engine, the combination of a cylinder, a head for the cylinder, a piston disposed within the cylinder, a relatively low temperature cooling jacket associated with the cylinder, a relatively high temperature cooling jacket associated with the cylinder head, and means for admitting cooling fluids at relatively low and high pressures to the cylinder jacket and the cylinder head jacket respectively.

6. In an engine, the combination of a cylinder, a head for the cylinder, a piston disposed within the cylinder, a relatively low temperature cooling jacket associated with the cylinder, a relatively high temperature cooling jacket associated with the cylinder head, means for admitting cooling fluids at relatively low and high pressures to the cylinder jacket and the cylinder head jacket, respectively, and insulating means interposed between the cylinder jacket and the cylinder head jacket for retarding the conduction of heat therebetween.

7. In an engine, the combination of a cylinder, a head for the cylinder, a piston disposed within the cylinder, said piston having a ring belt portion and a head portion projecting beyond the ring belt portion, piston rings disposed on the ring belt portion and engaging the cylinder, said cylinder head being provided with circumferential and lateral walls forming a combustion chamber and said combustion chamber being disposed beyond the cylinder and arranged to receive the projecting head portion of the piston, a cooling jacket disposed about the cylinder, a second cooling jacket disposed about the circumferential and lateral walls of the cylinder head, and means for admitting cooling media separately to the cylinder cooling jacket and to the cylinder head cooling jacket.

8. In an engine, the combination of a cylinder, a piston disposed within the cylinder, said piston having a ring belt portion and a head portion projecting beyond the ring belt portion, piston rings disposed on the ring belt portion of the piston and engaging the cylinder, a head for the cylinder, said cylinder head being provided with circumferential and lateral walls forming a combustion chamber and said combustion chamber being disposed beyond the cylinder and arranged to receive the projecting head portion of the piston, a relatively low temperature cooling jacket disposed about the cylinder, a relatively high temperature cooling jacket disposed about the circumferential and lateral walls of the cylinder head, means for admitting relatively low pressure cooling fluid to the cylinder jacket and means for admitting relatively high pressure cooling fluid to the cylinder head jacket.

9. In an engine, the combination of a cylinder, a cylinder head including a cooling jacket, a cooling jacket for the cylinder, means for securing the cylinder head and the cylinder cooling jacket to one end of the cylinder, means for slidably supporting the other end of the cylinder with respect to the cylinder cooling jacket, whereby relative axial expansion of the cylinder and cylinder cooling jacket is permitted, and means for admitting cooling media separately to the cylinder jacket and the jacket of the cylinder head.

10. In an engine, the combination of a cylinder, a piston arranged to reciprocate within the cylinder, a head secured to the cylinder, said piston defining with the cylinder head a combustion chamber and with the end of the cylinder remote from the head a compression chamber, a cooling jacket associated with the cylinder, a separate cooling jacket associated with the cylinder head, and means for admitting cooling media separately to the two jackets.

11. In an engine, the combination of a cylinder having a barrel portion and a head portion, a piston disposed within the cylinder and movable in the barrel portion thereof, a cooling jacket associated with the barrel portion, a cooling jacket associated with the head portion, means for admitting cooling fluid to the jacket of the barrel portion, means for conveying cooling fluid from the jacket of the barrel portion to the jacket of the head portion, and means disposed in said conveying means for increasing the pressure of the cooling fluid passing from the jacket of the barrel portion to the jacket of the head portion.

12. An engine as claimed in claim 11 wherein valve means is disposed in said conveying means for maintaining a predetermined pressure upon the cooling fluid in the jacket of the barrel portion.

In testimony whereof, I have hereunto subscribed my name this sixth day of October, 1927.

RICHARD WILLIAM BAILEY.